United States Patent
Sickles

[19]

[11] Patent Number: 5,931,609
[45] Date of Patent: Aug. 3, 1999

[54] APPARATUS AND METHOD FOR MOVING GOLF BALLS FROM BALL WASHER TO BALL DISPENSER

[75] Inventor: John J. Sickles, Albany, N.Y.

[73] Assignee: Sickles Golf Corporation, Albany, N.Y.

[21] Appl. No.: 08/768,203

[22] Filed: Dec. 17, 1996

[51] Int. Cl.[6] .......................... B65G 51/36; B65G 51/20; B65G 53/36; B65G 51/24

[52] U.S. Cl. .............................. 406/1; 406/83; 406/156; 406/183; 406/193; 406/195

[58] Field of Search .............. 406/83, 183, 181, 406/195, 193, 1, 11, 48, 47, 155, 156

[56] References Cited

U.S. PATENT DOCUMENTS

| | | | |
|---|---|---|---|
| 3,820,183 | 6/1974 | Gustafson et al. | 15/21.2 |
| 4,162,811 | 7/1979 | Hobbs | 406/94 |
| 4,304,105 | 12/1981 | West | 62/375 |
| 4,970,746 | 11/1990 | Brackmann | 15/21.2 |
| 5,067,857 | 11/1991 | Ward | 406/181 |
| 5,127,773 | 7/1992 | Foreman et al. | 406/83 X |
| 5,139,577 | 8/1992 | Brock | 134/25.4 |
| 5,228,168 | 7/1993 | Hollrock et al. | 15/302 |
| 5,372,277 | 12/1994 | Waring | 406/181 X |
| 5,373,597 | 12/1994 | Worsham | 15/21.2 |

Primary Examiner—William E. Terrell
Assistant Examiner—K. W. Bower
Attorney, Agent, or Firm—Schmeiser, Olsen & Watts

[57] ABSTRACT

An apparatus and method for moving golf balls from a ball washer to a ball dispenser is disclosed. A system of conduits is employed, connecting a ball washer to a dispenser. Balls are forced out of the washer and into an entry conduit where a drain rids the system of fluids. Balls are slowed down by a restricted region in the entry conduit prior to entry into a main conduit. Upon entering the main conduit, balls are forced upward by high velocity air being expelled by a blower. Obstructions are minimized and relieved by an opening in the side of the main conduit. Balls are prevented from backing up into the blower, even in case of obstruction, by an angled pipe or nozzle with a diameter smaller than that of a golf ball. Balls travel through the main conduit and into an exit conduit where they strike a shock absorbing pad prior to dropping into the dispenser. In a second embodiment, an alternative exit conduit is provided whereby balls may be diverted to a receptacle other than the dispenser.

16 Claims, 2 Drawing Sheets

APPARATUS AND METHOD FOR MOVING GOLF BALLS FROM BALL WASHER TO BALL DISPENSER

FIELD OF THE INVENTION

The present invention relates generally to automated devices for conveying golf balls. More particularly, the present invention relates to devices and methods for moving golf balls from ball washers to ball dispensers.

BACKGROUND OF THE INVENTION

Numerous balls are used each day at driving ranges on golf courses, and because of the sheer volume of ball use on such ranges, a wide variety of mechanical devices have been developed to assist golf course staff in collecting, cleaning and redistributing range balls to golfers. One step in this process involves washing balls in mechanical ball washing machines and then transporting them to dispensers for redistribution. Often, transporting of the balls from washing machine to dispensers has been done manually in a bucket or similar device. However, due to the height of some dispensers and the weight of large buckets of golf balls, injuries may result from lifting the bucket of balls to empty it into the dispenser. Furthermore, manual transportation of the balls from washer to dispenser requires time and people, thus increasing operating costs.

In response to this problem, several conveyor-type devices for golf balls and the like have been developed. Some of these devices are combined with washing devices and others are not. Among these devices are U.S. Pat. No. 5,228,168 to Hollrock et al., U.S. Pat. No. 5,139,577 to Brock, and U.S. Pat. No. 5,373,597 to Worsham.

U.S. Pat. No. 5,228,168 to Hollrock et al. discloses a golf ball handling system including a conventional ball washer with brushes. A blower delivers the washed balls through conduits and into a dispenser.

However, this device does not provide a means for draining away water or cleaning fluid before the balls enter the flow of the airstream. Depending on the amount of fluid escaping from the ball washer, this could result in excess water entering the blower or in unnecessary wear and tear on the blower in forcing both excess fluids and balls upward through the conduit. Furthermore, although this device is supposed to dry the balls before they leave the conduits, the short time the balls are in the conduit combined with excess fluid escaping from the washer and entering the conduit system may negate the drying effects of the blower. Furthermore, some ball washers force balls out at high speeds. Thus, without any means for damping some of the speed of balls as they exit a washer, this device may be susceptible to damage from entering balls.

U.S. Pat. No. 5,139,577 to Brock discloses a golf ball processing system including a pump and receptacle. The pump forces water up a conduit into a fluid collection trough. The balls then drop into the receptacle.

This device actually pumps both fluid and balls through the conduit system. Although an inclined screen device will drain off much of the fluid prior to entry of the balls into the dispensing receptacle, it is anticipated in the disclosure of this device that the balls will be wet when entering the dispenser. Furthermore, this device will not work in combination with conventional ball washers.

U.S. Pat. No. 5,373,597 to Worsham discloses a ball cleaning apparatus including a cleaning channel having brushes. After being sprayed with solution and water, the balls are urged through conduits and eventually into a collection container by air flow from a fan. As with the Brock device, this device may not be used in combination with a conventional ball washer, which may increase its cost.

SUMMARY OF THE INVENTION

The present invention is a system for conveying balls (e.g., golf balls) from a convention ball washer to a dispensing device. The system uses a series of conduits, a drain which drains off fluids prior to balls' entry into the system of conduits, and a blower for forcing the balls through the conduits and into a dispenser or other container. The device also used a restricted region in the entry conduit to dampen the speed of balls entering from a ball washer, thus minimizing or preventing damage to the conduit system. The present invention includes an exit port positioned between the ends of the conduit. An obstruction device allows for an alternate path of exit.

It is therefore an advantage of the present invention to provide a system for moving golf balls from a ball washer to a ball dispenser or other container while avoiding excess water entry into the dispenser.

It is therefore a further advantage of the present invention to provide a system for moving golf balls from a ball washer to a ball dispenser or other container while minimizing damage to the system from high velocity movement of balls through it.

It is therefore a further advantage of the present invention to provide a system for moving golf balls from a ball washer to a ball dispenser which may be used in combination with conventional ball washers.

BRIEF DESCRIPTION OF THE DRAWINGS

These and other advantages of the present invention will become more apparent upon examination of the drawings wherein.

DETAILED DESCRIPTION OF THE PREFERRED EMBODIMENTS

Figure 1:
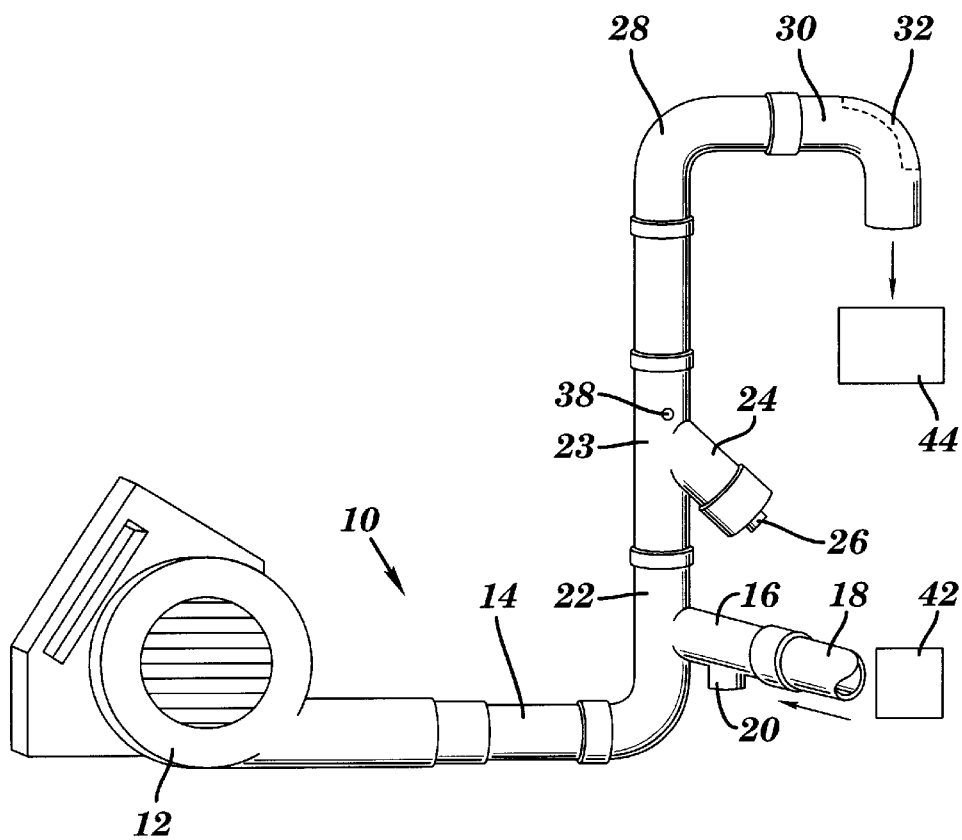
FIG. 1 is a side perspective view of the conduit system of a first preferred embodiment of the present invention.

Referring to FIG. 1, a side perspective view of the conduit system 10 of the present invention is shown. Balls enter from a conventional ball washer 42 through the washer hose 18, which may be connected to the entry conduit 16. The entry conduit contains a drain 20 which has a smaller diameter than that of a golf ball and which drains fluid out of the system before the ball enters the main conduit system comprised of a first and second conduit 22 and 23. The water leaving the drain 20 may go onto the floor or be piped away.

In this embodiment a 125 mph 30 cubic foot blower 12 with a 1 horsepower magnet motor is used to forced air through the conduit system 10 at high velocity. However, other blowers could be used with the system so long as they generate adequate air speed velocity to force golf balls through the system.

Air in the system travels from the blower 12 through the blower attachment conduit 14 and up through the main conduits 22 and 23. First conduit 22 attaches intersects with the entry conduit 16. It is at this point that balls enter from the washer.

Balls are then forced by the air through second conduit 23, which is fitted with an obstruction relief mechanism 24. The obstruction relief mechanism 24 may contain a removable plug 26. This removable plug 26 can be left in place when a person is supervising or is nearby to shut down the system in case of an obstruction. Otherwise, the removable plug 26 should be left out and a bucket or other means placed under the obstruction relief mechanism 24 to catch balls which are forced out by an obstruction.

Balls travel from the second conduit 23 up through the first and second exit conduits 28, 30. The second exit conduit 30 contains a damping pad 32 for absorbing force and reducing noise from the balls as they exit the conduit system 10. After striking the damping pad 32, the balls drop into the dispenser 44 where they may be gathered for re-use.

Figure 2:
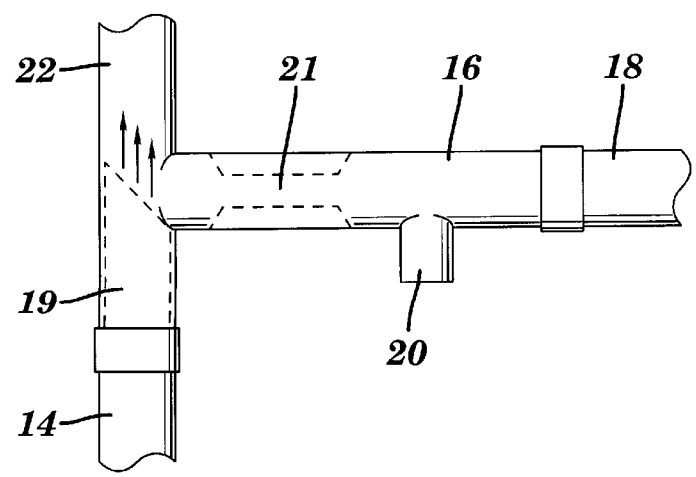
FIG. 2 is a side view of the intersection between the entry conduit and the main conduit of the present invention.

Referring to FIG. 2, a side view of the intersection between the entry conduit 16 and the first conduit 22 is shown. The connection to the washer hose 18 is shown, as well as the drain 20. Also shown here is the restricted region 21 within the entry conduit 16. This restricted region 21 dampens the velocity of an entering ball, thus preventing damage to the conduit system 10 by balls entering at high speeds.

The blower nozzle 19 depicted in this figure is smaller in diameter than a golf ball so as to preclude backflow of balls into the blower 12 even in the case of an obstruction. The blower nozzle 19 is angled to assist in redirecting the golf balls as they enter the conduits 22, 23.

Figure 3:
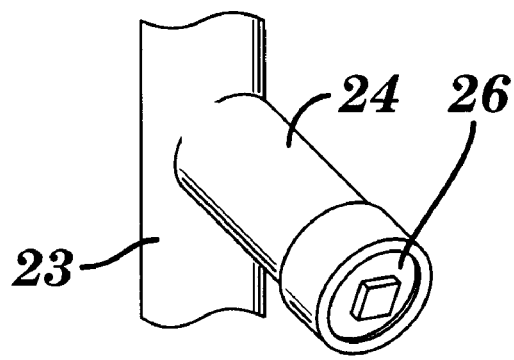
FIG. 3 is a side perspective view of the obstruction relief means of the present invention.

Referring to FIG. 3, the obstruction relief mechanism is shown in greater detail. A removable plug 26 is removed when the system is running unattended. If the balls become jammed in the conduit, they automatically fall through the exit port due to gravity. For example, in a run of 1,000 golf balls, approximately 6 will fall from the exit port. A pin 40 is inserted into the conduit downstream as shown in FIG. 1, the exit port 24 for filling a basket manually with balls.

Figure 4:
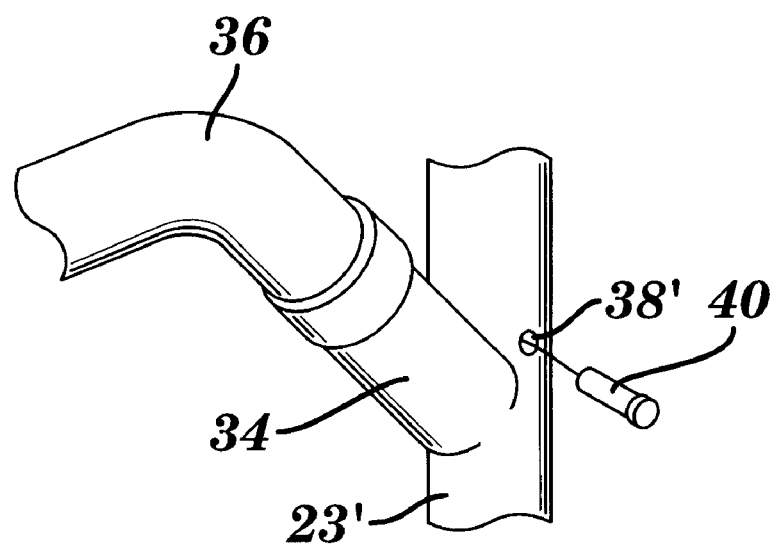
FIG. 4 is a side perspective view of an alternative embodiment of the main conduit of the present invention; and wherein like numbers refer to like elements consistently throughout the disclosure.

FIG. 4 shows an alternative embodiment of conduit 23'. This embodiment would still include the obstruction relief mechanism, which would be located at some point lower than the portion of the conduit 23' depicted here.

However, in this embodiment, an alternate exit conduit 34 is provided. Thus, balls may be diverted by inserting pin 40 into hole 38'. Balls would then be forced out the alternate exit conduit 34 and through a hose 36. This hose 36 could be placed in a bucket, storage container, or any other desired receptacle 46.

The foregoing description of the preferred embodiments of this invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

What is claimed is:

1. Apparatus for conveying golf balls from a washer to a dispenser comprising:

a system of interconnected conduits including a main conduit having a blower attached thereto;

a restricted region; and a drain positioned between said washer and said blower, whereby water can be drained out of said system of interconnected conduits and said golf balls entering from said washer may be slowed down prior to the golf balls' entry into said main conduit.

2. The apparatus of claim 1, wherein said restricted region contains an opening with a diameter that will only allow passage of one of said golf balls at a time.

3. The apparatus of claim 1, wherein said main conduit includes an obstruction relief means, whereby any of said golf balls that obstruct said main conduit may be removed.

4. The apparatus of claim 3, wherein said obstruction relief means includes a removable plug.

5. The apparatus of claim 4, further comprising a means for preventing backflow of said golf balls into said blower.

6. The apparatus of claim 5, further comprising an exit conduit attached to said main conduit.

7. The apparatus of claim 6, wherein said exit conduit includes a pad for damping a force of said golf ball as they pass through said exit conduit.

8. The apparatus of claim 7, wherein said main conduit further includes an alternate exit conduit, whereby said golf balls may be diverted to another location.

9. The apparatus of claim 8, wherein said main conduit further includes a means for diverting said golf balls from said main conduit into said alternate exit conduit.

10. A method for conveying golf balls from a ball washer to a dispenser comprising the steps of:

providing a system of conduits attached to a blower and connecting said ball washer to said dispenser;

draining fluid from said system of conduits as said fluid comes from said washer;

using a restricted region to slow down said golf balls as said golf balls enter said system of conduits from said washer;

using said blower to force said golf balls through said system of conduits and into said dispenser; and absorbing a portion of the golf balls' force prior to the golf balls' entry into said dispenser by employing shock absorbing means.

11. The method of claim 10, further comprising the step of using an opening in said system of conduits to prevent or to relieve obstructions.

12. The method of claim 10, further comprising the step of preventing backflow of said golf balls into said blower using a small diameter pipe or nozzle, whereby air may pass through said small diameter pipe or nozzle, but said golf balls may not.

13. The method of claim 10, further comprising the step of diverting one of the balls out of said system of conduits into a receptacle other than said dispenser.

14. The method of claim 13, wherein said step of diverting a golf ball out of said system of conduits into a receptacle other than said dispenser comprises blocking the path of the golf ball within said system of conduits and providing an alternative path of exit using another conduit attached to said system of conduits.

15. Apparatus for conveying golf balls comprising:

a conduit including a first end having an entry port and a second end having an exit port;

an alternate path of exit positioned between said first and second ends; and an obstruction device, removably attached to said conduit and positioned downstream of said alternate path of exit.

16. The apparatus of claim 15 wherein said obstruction device is a pin.

* * * * *